US011085683B2

(12) United States Patent
Contrada et al.

(10) Patent No.: US 11,085,683 B2
(45) Date of Patent: Aug. 10, 2021

(54) SYSTEMS AND METHODS FOR OPTICAL DETECTION OF REFRIGERATION SYSTEM ABNORMALITIES

(71) Applicant: Emerson Climate Technologies Retail Solutions, Inc., Kennesaw, GA (US)

(72) Inventors: Anthony Contrada, Kennesaw, GA (US); John Wallace, Acworth, GA (US)

(73) Assignee: Emerson Climate Technologies Retail Solutions, Inc., Kennesaw, GA (US)

( * ) Notice: Subject to any disclaimer, the term of this patent is extended or adjusted under 35 U.S.C. 154(b) by 48 days.

(21) Appl. No.: 16/394,314

(22) Filed: Apr. 25, 2019

(65) Prior Publication Data

US 2019/0390885 A1    Dec. 26, 2019

Related U.S. Application Data

(60) Provisional application No. 62/688,740, filed on Jun. 22, 2018.

(51) Int. Cl.
*F25B 49/02* (2006.01)
*G01N 21/31* (2006.01)

(52) U.S. Cl.
CPC ............ *F25B 49/02* (2013.01); *G01N 21/31* (2013.01); *F25B 2700/03* (2013.01); *F25B 2700/04* (2013.01)

(58) Field of Classification Search
CPC .. F25B 2700/03; F25B 2700/04; F25B 49/02; F25B 41/006
See application file for complete search history.

(56) References Cited

U.S. PATENT DOCUMENTS

| 4,577,469 | A | * | 3/1986 | Okura | ................. | B60H 1/3225 |
| | | | | | | 62/126 |
| 5,072,595 | A | * | 12/1991 | Barbier | ................. | F25B 41/006 |
| | | | | | | 250/577 |
| 5,103,648 | A | * | 4/1992 | Barbier | ............... | G01F 23/2925 |
| | | | | | | 62/126 |

(Continued)

FOREIGN PATENT DOCUMENTS

| EP | 2725312 A2 | * | 4/2014 | ............ F25B 49/005 |
| EP | 3009772 A1 | * | 4/2016 | ............ F25B 41/006 |

(Continued)

OTHER PUBLICATIONS

International Search Report regarding International Application No. PCT/US2019/037768, dated Oct. 4, 2019.

(Continued)

*Primary Examiner* — Nelson J Nieves
(74) *Attorney, Agent, or Firm* — Harness, Dickey & Pierce, P.L.C.

(57) ABSTRACT

Systems and methods are provided and include an optical sensor configured to be disposed on a sight glass. The optical sensor is configured to generate signals based on a light reflectivity associated with a liquid of the refrigeration system. An optical sensor control module that includes a processor that is configured to execute instructions stored in a nontransitory memory, and the instructions include (i) generating a set of data based on the signals, and (ii) determining an amount of liquid of the refrigeration system based on the set of data.

20 Claims, 13 Drawing Sheets

(56) References Cited

U.S. PATENT DOCUMENTS

| | | | | |
|---|---|---|---|---|
| 5,836,165 A * | 11/1998 | Champion | ............. | F16F 15/02 62/6 |
| 6,125,642 A * | 10/2000 | Seener | ............. | F04C 18/0215 184/103.1 |
| 6,131,471 A * | 10/2000 | Okoren | ............. | F04B 39/0207 340/609 |
| 6,505,475 B1 * | 1/2003 | Zugibe | ............. | F24F 11/30 62/192 |
| 7,905,099 B2 * | 3/2011 | Justak | ............. | F25B 49/005 62/127 |
| 8,394,087 B2 * | 3/2013 | Willyard | ............. | A61B 18/1815 606/34 |
| 9,316,524 B2 * | 4/2016 | Kopansky | ............. | G01F 23/2925 |
| 10,731,907 B2 * | 8/2020 | Subramaniam | ............. | H02P 27/085 |
| 2007/0256432 A1 * | 11/2007 | Zugibe | ............. | F25B 43/02 62/115 |
| 2008/0034763 A1 * | 2/2008 | Cho | ............. | F25B 41/006 62/129 |
| 2009/0113905 A1 * | 5/2009 | Ericsson | ............. | F25B 41/006 62/126 |
| 2009/0272145 A1 * | 11/2009 | Ericsson | ............. | F25B 41/006 62/503 |
| 2010/0247331 A1 * | 9/2010 | Heinbokel | ............. | F25B 1/02 417/12 |
| 2012/0041608 A1 * | 2/2012 | Zugibe | ............. | G01N 25/18 700/285 |
| 2013/0186189 A1 * | 7/2013 | Fuhrmann | ............. | F25B 41/006 73/73 |
| 2014/0026608 A1 * | 1/2014 | Manzo | ............. | F25B 40/02 62/305 |
| 2016/0025396 A1 * | 1/2016 | Marshall | ............. | F25B 41/062 62/115 |
| 2017/0042373 A1 * | 2/2017 | Alexander | ............. | A47G 19/02 |
| 2017/0294103 A1 * | 10/2017 | Vanberg | ............. | G01N 11/04 |
| 2019/0032975 A1 * | 1/2019 | Hancock | ............. | F25B 49/02 |
| 2019/0203882 A1 * | 7/2019 | Li | ............. | F25B 31/004 |
| 2019/0293329 A1 * | 9/2019 | Ochiai | ............. | F25B 43/02 |

FOREIGN PATENT DOCUMENTS

| | | | | |
|---|---|---|---|---|
| JP | H07043052 A | | 2/1995 | |
| JP | H08-023459 B2 | | 3/1996 | |
| JP | H08145518 A | | 6/1996 | |
| JP | 2000104982 A | | 4/2000 | |
| JP | 2004125393 A | * | 4/2004 | |
| JP | 3601243 B2 | | 12/2004 | |
| KR | 20080050495 A | * | 6/2008 | ............. F25B 41/006 |
| WO | WO-2007055635 A1 | * | 5/2007 | ............. F25B 41/006 |
| WO | WO-2015111222 A1 | * | 7/2015 | ............. F25B 41/006 |
| WO | WO-2016089032 A1 | * | 6/2016 | ............. H02P 27/06 |

OTHER PUBLICATIONS

Written Opinion of the International Searching Authority regarding International Application No. PCT/US2019/037768, dated Oct. 4, 2019.

* cited by examiner

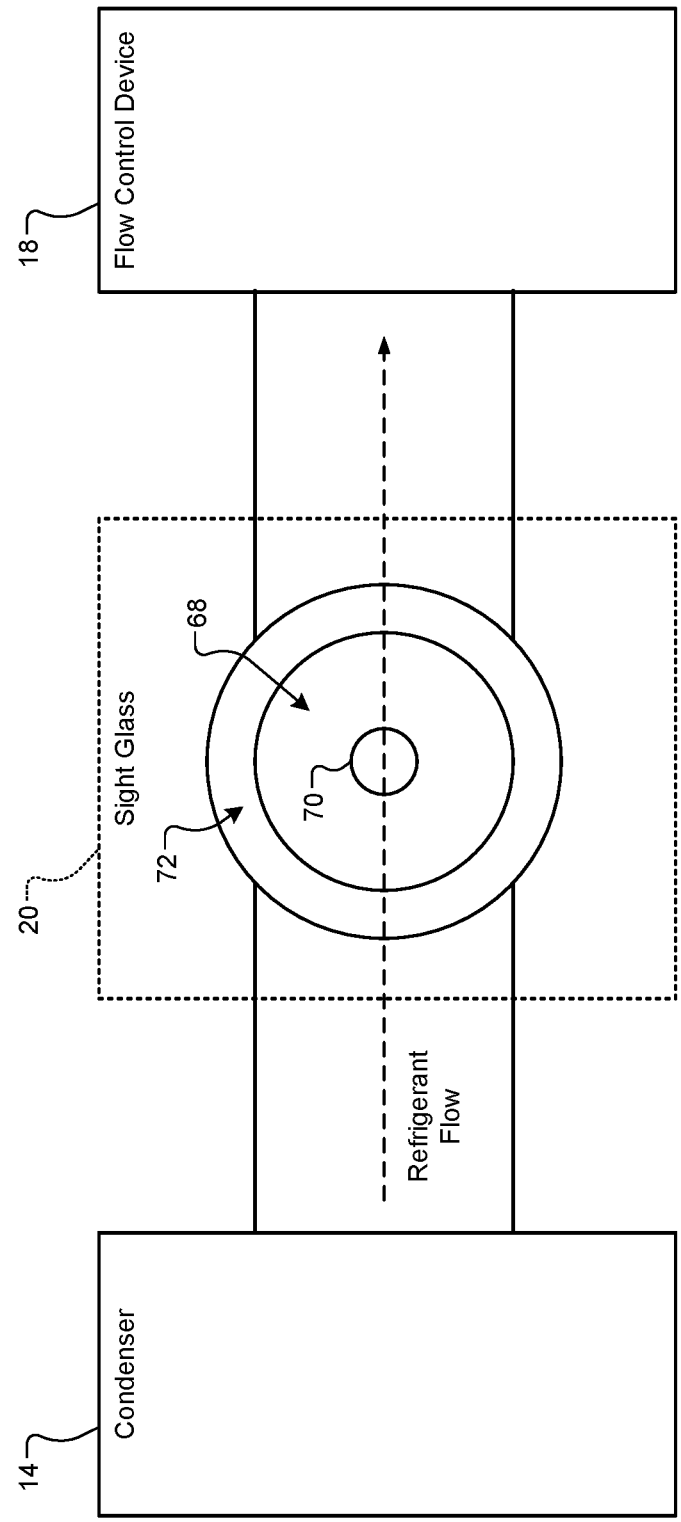

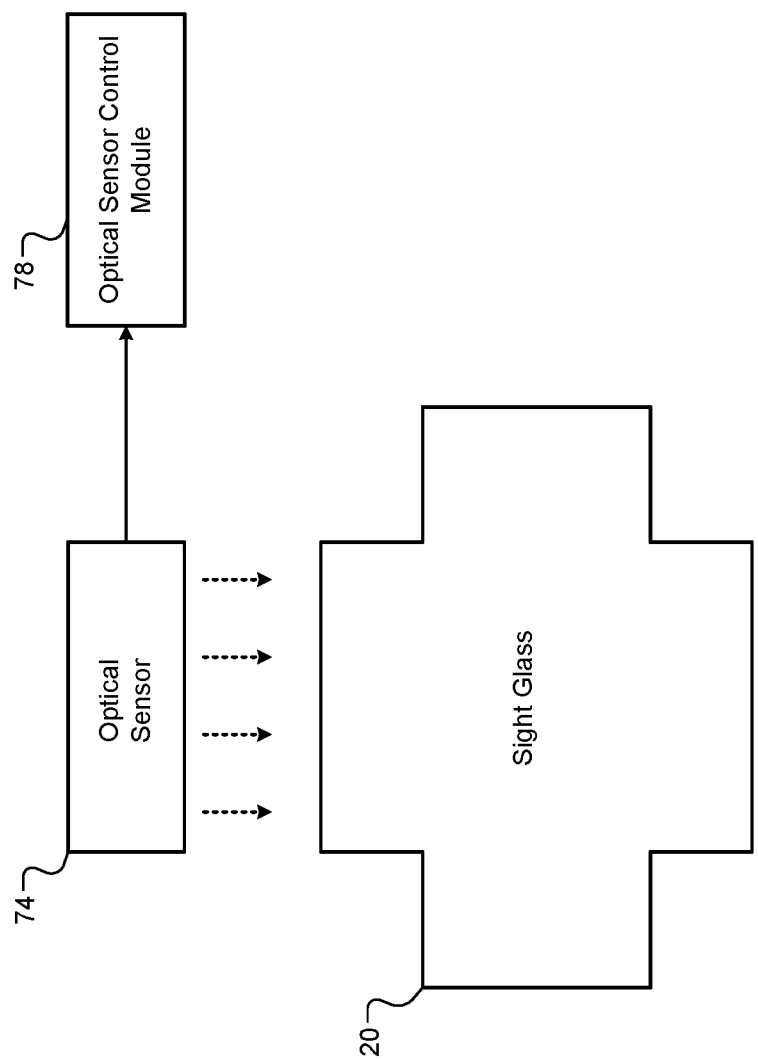

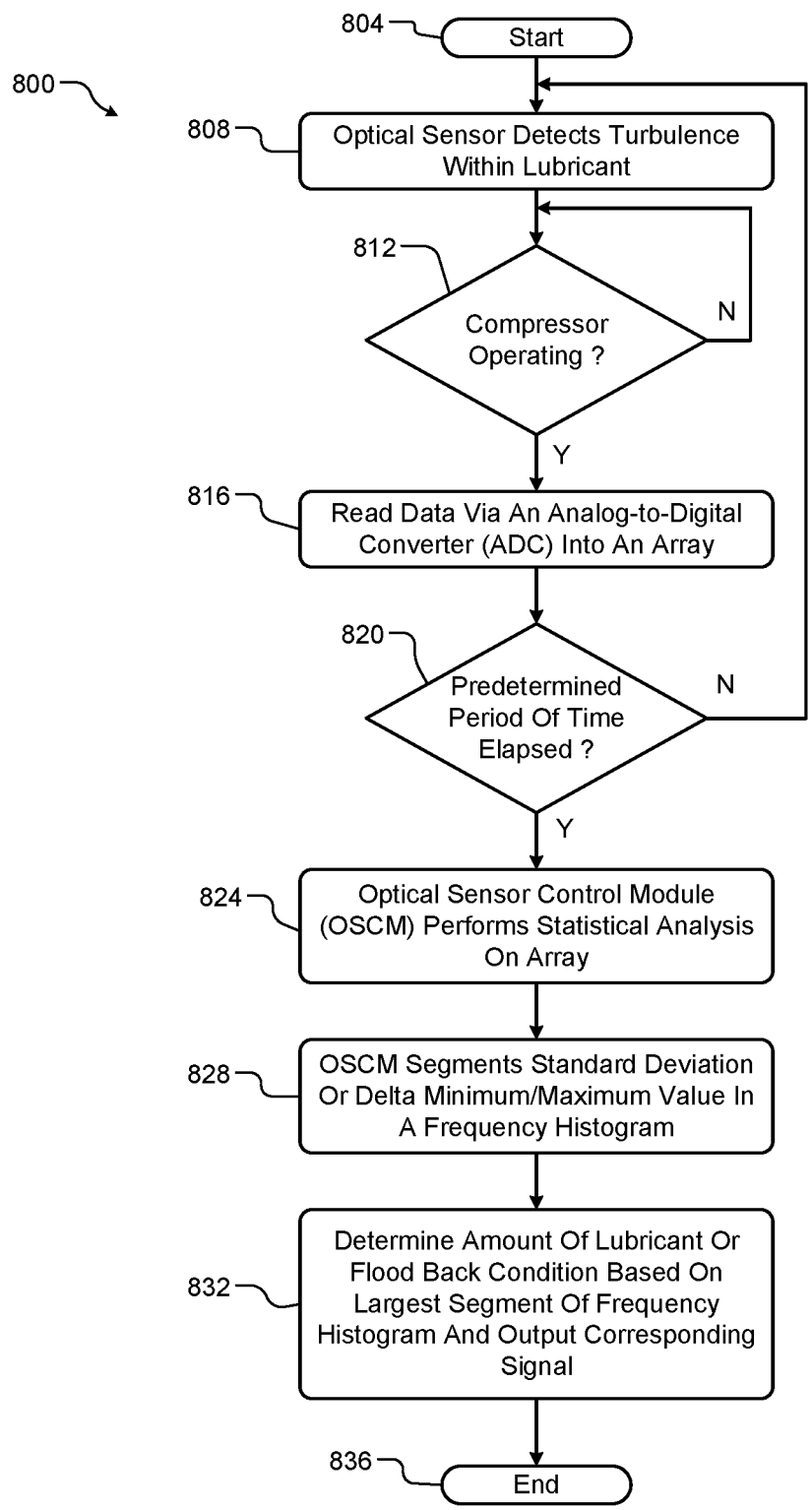

SYSTEMS AND METHODS FOR OPTICAL DETECTION OF REFRIGERATION SYSTEM ABNORMALITIES

CROSS-REFERENCE TO RELATED APPLICATIONS

This application claims the benefit of U.S. Provisional Application No. 62/688,740, filed on Jun. 22, 2018. The entire disclosure of the above application is incorporated herein by reference.

FIELD

The present disclosure relates to systems and methods for optical detection of refrigeration system abnormalities.

BACKGROUND

This section provides background information related to the present disclosure and is not necessarily prior art.

Sight glasses are used in a wide variety of industrial and residential applications including, but not limited to, heating, ventilating, and air conditioning (HVAC) systems and refrigeration systems. As an example, a technician may observe a flow of refrigerant through an HVAC or refrigeration system using a sight glass, and the technician may subsequently determine various characteristics of the HVAC or refrigeration system, such as an amount of refrigerant charge of the HVAC or refrigeration system. As another example, a technician may observe a lubricant of a compressor using a sight glass, and the technician may subsequently determine various characteristics of the HVAC or refrigeration system, such as an amount of lubricant within the compressor.

SUMMARY

This section provides a general summary of the disclosure, and is not a comprehensive disclosure of its full scope or all of its features.

The present disclosure provides a refrigeration system that includes an optical sensor configured to be disposed on a sight glass. The optical sensor is configured to generate signals based on a light reflectivity associated with a liquid of the refrigeration system. An optical sensor control module that includes a processor that is configured to execute instructions stored in a nontransitory memory, and the instructions include (i) generating a set of data based on the signals, and (ii) determining an amount of liquid of the refrigeration system based on the set of data.

In some configurations, the set of data is a frequency distribution.

In some configurations and in response to the liquid being a refrigerant, the instructions further include generating the frequency distribution associated with the refrigerant, wherein the frequency distribution is based on a fast Fourier transform (FFT) of the signals. The instructions also include determining at least one probability, wherein each of the at least one probability corresponds to an amount of refrigerant of the refrigeration system. The instructions also include determining the amount of refrigerant of the refrigeration system based on the at least one probability.

In some configurations and in response to the liquid being a refrigerant, the instructions further include generating the frequency distribution associated with the refrigerant, wherein the frequency distribution is based on a fast Fourier transform (FFT) of the signals. The instructions also include generating a weight ratio based on (i) a first sum of frequency components of a first set of frequency bins of the frequency distribution and (ii) a second sum of frequency components of a second set of frequency bins of the frequency distribution, wherein each value of each frequency bin of the first set of frequency bins of the frequency distribution is less than each value of each frequency bin of the second set of frequency bins of the frequency distribution, and each value of the frequency distribution is associated with dynamic flow characteristics of the refrigerant. The instructions also include, in response to the weight ratio being less than a threshold weight ratio, generating a first alert signal indicating an insufficient amount of refrigerant of the refrigeration system.

In some configurations, generating the weight ratio further comprises dividing the first sum of frequency components of the first set by the second sum of frequency components of the second set.

In some configurations and in response to the liquid being a lubricant of a compressor of the refrigeration system, the instructions further include generating the frequency distribution associated with the lubricant, wherein the frequency distribution is based on a standard deviation of the signals. The instructions also include identifying a largest frequency component of the frequency distribution and determining an amount of lubricant based on the largest frequency component.

In some configurations, the instructions further include determining whether the compressor is operating in a flooded state based on the largest frequency component.

In some configurations and in response to the liquid being a lubricant of a compressor of the refrigeration system, the instructions further include generating the frequency distribution associated with the lubricant, wherein the frequency distribution is based on a difference between a maximum value and a minimum value of the signals. The instructions also include identifying a largest frequency component of the frequency distribution and determining an amount of lubricant based on the largest frequency component.

In some configurations, the instructions further include determining whether the compressor is operating in a flooded state based on the largest frequency component.

In some configurations, the instructions include transmitting an alert signal based on the amount of liquid to at least one of a remote server and a local controller in communication with the optical sensor control module.

In some configurations, the alert signal is configured to cause at least one of a computing device in communication with the remote server and the local controller to generate an indication corresponding to the alert signal.

The present disclosure also provides a method that includes generating, using an optical sensor, signals based on a light reflectivity associated with a liquid of a refrigeration system, wherein the optical sensor is configured to be disposed on a sight glass. The method also includes generating, using an optical sensor control module, a set of data based on the signals, wherein the optical sensor control module includes a processor that is configured to execute instructions stored in a nontransitory memory. The method also includes determining, using the optical sensor control module, an amount of liquid of the refrigeration system based on the set of data.

In some configurations, the set of data is a frequency distribution.

In some configurations and in response to the liquid being a refrigerant, the method further comprises generating the frequency distribution associated with the refrigerant, wherein the frequency distribution is based on a fast Fourier transform (FFT) of the signals. The method also includes determining at least one probability, wherein each of the at least one probability corresponds to an amount of refrigerant of the refrigeration system. The method also includes determining the amount of refrigerant of the refrigeration system based on the at least one probability.

In some configurations and in response to the liquid being a refrigerant, the method further comprises generating, using the optical sensor control module, the frequency distribution associated with the refrigerant, wherein the frequency distribution is based on a fast Fourier transform (FFT) of the signals. The method also includes generating, using the optical sensor control module, a weight ratio based on (i) a first sum of frequency components of a first set of frequency bins of the frequency distribution and (ii) a second sum of frequency components of a second set of frequency bins of the frequency distribution, wherein each value of each frequency bin of the first set of frequency bins of the frequency distribution is less than each value of each frequency bin of the second set of frequency bins of the frequency distribution, and each value of the frequency distribution is associated with dynamic flow characteristics of the refrigerant. The method also includes, in response to the weight ratio being less than a threshold weight ratio, generating, using the optical sensor control module, a first alert signal indicating an insufficient amount of refrigerant of the refrigeration system.

In some configurations, generating the weight ratio further comprises dividing the first sum of frequency components of the first set by the second sum of frequency components of the second set.

In some configurations and in response to the liquid being a lubricant of a compressor of the refrigeration system, the method further comprises generating the frequency distribution associated with the lubricant, wherein the frequency distribution is based on a standard deviation of the signals. The method also includes identifying a largest frequency component of the frequency distribution and determining an amount of lubricant based on the largest frequency component.

In some configurations, the method further includes determining whether the compressor is operating in a flooded state based on the largest frequency component.

In some configurations and in response to the liquid being a lubricant of a compressor of the refrigeration system, the method further comprises generating the frequency distribution associated with the lubricant, wherein the frequency distribution is based on a difference between a maximum value and a minimum value of the signals. The method also includes identifying a largest frequency component of the frequency distribution and determining an amount of lubricant based on the largest frequency component.

In some configurations, the method further includes determining whether the compressor is operating in a flooded state based on the largest frequency component.

In some configurations, the method further includes transmitting an alert signal based on the amount of liquid to at least one of a remote server and a local controller in communication with the optical sensor control module.

In some configurations, the alert signal is configured to cause at least one of a computing device in communication with the remote server and the local controller to generate an indication corresponding to the alert signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is an example illustration of a sight glass according to the present disclosure.

FIGS. 5A-5B are example illustration of a sight glass and an optical sensor device according to the present disclosure.

FIG. 8 is a flowchart for another control algorithm according to the present disclosure.

Corresponding reference numerals indicate corresponding parts throughout the several views of the drawings.

DETAILED DESCRIPTION

Example embodiments will now be described more fully with reference to the accompanying drawings.

Figure 1A:
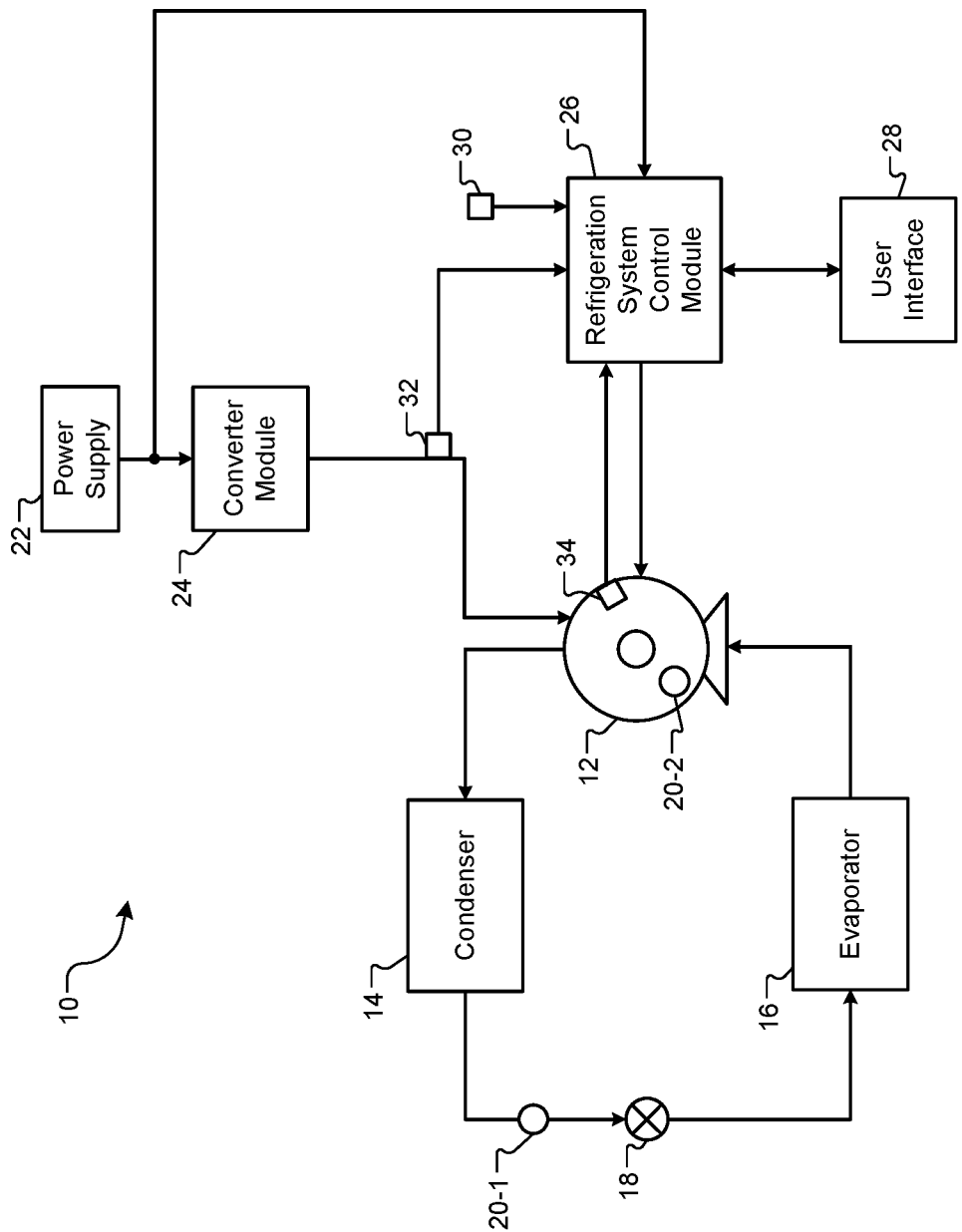
FIGS. 1A-1B are functional block diagrams of example refrigeration systems according to the present disclosure.

With reference to FIG. 1A, an example refrigeration system 10 is shown and includes a compressor 12, a condenser 14, an evaporator 16, and a flow control device 18. The refrigeration system 10, for example, may be an HVAC system, with the evaporator 16 located indoors and the compressor 12 and condenser 14 located in a condensing unit outdoors.

The compressor 12 receives refrigerant in vapor form and compresses the refrigerant. The compressor 12 provides pressurized refrigerant in vapor form to the condenser 14. The compressor 12 includes an electric motor (shown in FIG. 2) that drives a pump, which may include a scroll compressor and/or a reciprocating compressor.

The pressurized refrigerant is converted into liquid form within the condenser 14. The condenser 14 transfers heat away from the refrigerant, thereby cooling the refrigerant. When the refrigerant vapor is cooled to a temperature that is less than a saturation temperature, the refrigerant transforms into a liquid refrigerant. The condenser 14 may include an electric fan that increases the rate of heat transfer away from the refrigerant.

The condenser 14 provides the refrigerant to the evaporator 16 through the flow control device 18. The flow control device 18 controls the flow rate at which the refrigerant is supplied to the evaporator 16. As an example, the flow control device 18 may be a capillary tube, a thermal expansion valve (TXV), or an electronic expansion valve (EXV). A pressure drop caused by the flow control device 18 may cause a portion of the liquid refrigerant to transform back into vapor form. As such, the evaporator 16 may receive a mixture of refrigerant vapor and liquid refrigerant.

The refrigerant absorbs heat in the evaporator 16. Liquid refrigerant transitions into vapor form when warmed to a temperature that is greater than the saturation temperature of the refrigerant. The evaporator 16 may include an electric fan that increases the rate of heat transfer to the refrigerant.

The refrigeration system 10 may include sight glass 20-1 and sight glass 20-2 (collectively referred to as sight glasses 20) that, for example, enable a technician to view the liquid refrigerant and/or lubricant of the refrigeration system 10. As an example, sight glass 20-1 enables the technician to view characteristics of liquid refrigerant discharged from the condenser 14. More specifically, the technician may be able to determine an amount of refrigerant charge of the refrigeration system 10 based on dynamic flow characteristics of the liquid refrigerant. As another example, sight glass 20-2 enables the technician to view characteristics of a lubricant (e.g., oil) of the compressor 12. More specifically, the technician may be able to determine an amount of lubricant of the compressor 12 and/or a flood back state of the compressor 12 using the sight glass 20-2. The sight glasses 20 are described below in further detail with reference to FIGS. 4-5.

The compressor 12 is connected to a power supply 22 via a converter module 24. As an example, the converter module 24 may be configured to convert a single-phase or three-phase alternating current (AC) power from the power supply having a first voltage to a second voltage suitable for operating the compressor 12. In one embodiment, the converter module 24 may include, but is not limited to, an electromagnetic interference (EMI) filter and protection circuit for protecting against power surges and sags and reducing EMI; a power factor correction (PFC) circuit that converts AC power to direct current (DC) power, improves the efficiency of the refrigeration system 10, and/or performs voltage conversion functions; and an inverter circuit for converting the DC power to an AC power suitable for operating the compressor 12.

A refrigeration system control module 26 controls the compressor 12 by turning the compressor 12 on and off. More specifically, the refrigeration system control module 26 controls a compressor contactor (shown in FIG. 2) that connects or disconnects an electric motor (shown in FIG. 2) of the compressor 12 to the power supply 22.

The refrigeration system control module 26 may be in communication with a number of sensors. For example, the refrigeration system control module 26 may receive outdoor ambient temperature data from an outdoor ambient temperature sensor 30 that may be located outdoors near the compressor 12 and condenser 14 to provide data related to the ambient outdoor temperature. The outdoor ambient temperature sensor 30 may also be located in the immediate vicinity of the compressor 12 to provide data related to the temperature at a location in the immediate vicinity of the compressor 12. Alternatively, the refrigeration system control module 26 may receive the outdoor ambient temperature data through communication with a thermostat, or remote computing device, such as a remote server, that monitors and stores outdoor ambient temperature data.

Additionally, the refrigeration system control module 26 may receive electrical current data from a current sensor 32 connected to a power input line between the power supply 22 and the compressor 12. The electrical current data may indicate an amount of current flowing to the compressor 12 when the compressor is operating. Alternatively, a voltage sensor or power sensor may be used in addition to, or in place of, the current sensor 32.

Additionally, the refrigeration system control module 26 may receive compressor temperature data from a compressor temperature sensor 34 attached to and/or located within the compressor 12. For example, the compressor temperature sensor 34 may be located at a lower portion of the compressor 12 due to any liquid refrigerant being located near the bottom of the compressor due to gravity and density. Other temperature sensors may be used. For example, alternatively, a motor temperature sensor may be used as the compressor temperature sensor 34.

The refrigeration system control module 26 may be located at or near the compressor 12 at the condensing unit that houses the compressor 12 and condenser 14. In such case, the compressor 12 may be located outdoors. Alternatively, the compressor 12 may be located indoors and inside a building associated with the refrigeration system. Alternatively, the refrigeration system control module 26 may be located at another location near the refrigeration system 10. For example, the refrigeration system control module 26 may be located indoors. Alternatively, the functionality of the refrigeration system control module 26 may be implemented in a refrigeration system controller. Alternatively, the functionality of the refrigeration system control module 26 may be implemented in a thermostat located inside a building associated with the refrigeration system 10. Alternatively, the functionality of the refrigeration system control module 26 may be implemented at a remote computing device.

A user interface 28 is configured to receive user inputs to the refrigeration system control module 26. As an example, the user inputs may include a desired temperature, requests regarding operation of a fan, and/or other suitable inputs. In one embodiment, the user interface 28 may be implemented by a thermostat.

Figure 1B:
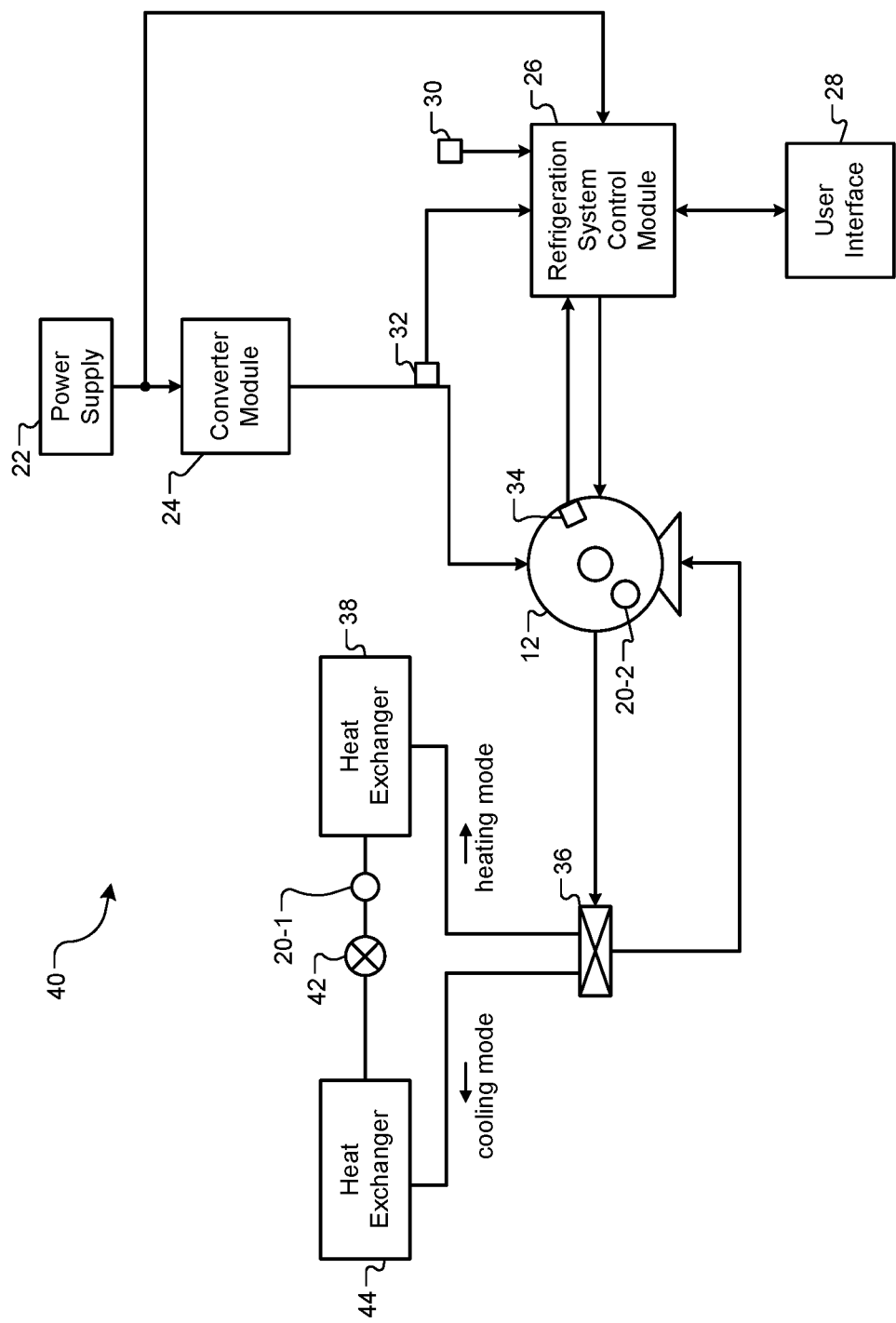

With reference to FIG. 1B, another refrigeration system 40 is shown. Refrigeration system 40 is a reversible heat pump system, operable in both a cooling mode and a heating mode. The refrigeration system 40 is similar to the refrigeration systems 10 shown in FIG. 1A, except that the refrigeration system 40 includes a four-way reversing valve 36. Further, the refrigeration system 40 includes an indoor heat exchanger 38 and an outdoor heat exchanger 44. In the cooling mode, refrigerant discharged from the compressor 12 is routed by the four-way reversing valve 36 to the outdoor heat exchanger 44, through a flow control device 42, to the indoor heat exchanger 38, and back to a suction side of the compressor 12. In the heating mode, refrigerant discharged from the compressor 12 is routed by the four-way reversing valve 36 to the indoor heat exchanger 38, through the flow control device 42, to the outdoor heat exchanger 44, and back to the suction side of the compressor 12. In a reversible heat pump system, the flow control device 42 may include an expansion device, such as a thermal expansion device (TXV) or electronic expansion device (EXV). Optionally, the flow control device 42 may include a plurality of flow control devices 42 arranged in parallel with a bypass that includes a check valve. In this way, the flow control device 42 may properly function in both the cooling mode and in the heating mode of the heat pump system. Other components of the refrigeration system 40 are the same as those described above with respect to FIG. 1A and their description is not repeated here.

Figure 2:
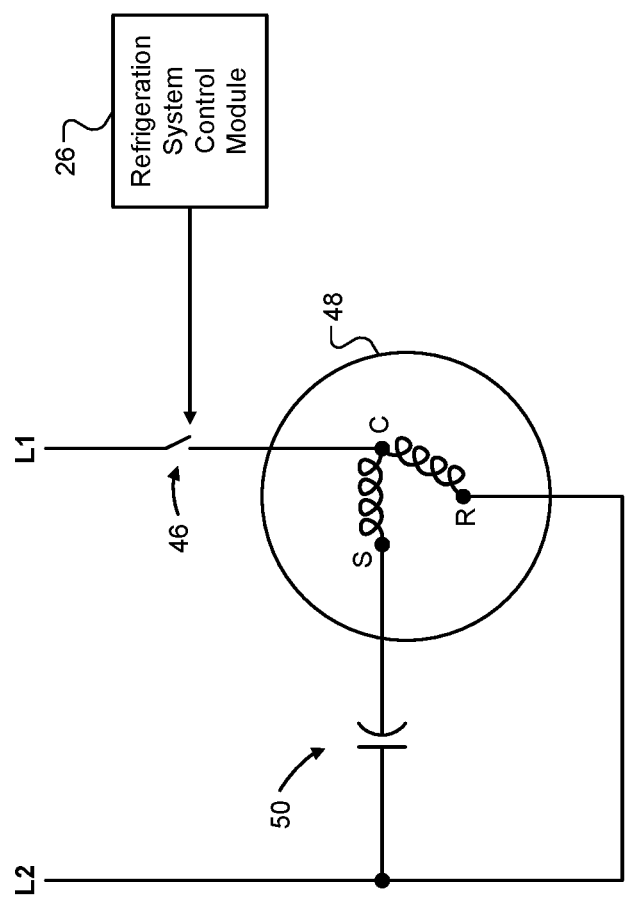
FIG. 2 is a diagram of an example compressor motor according to the present disclosure.

With reference to FIG. 2, the electric motor 48 of the compressor 12 is shown. As shown, a first electrical terminal (L1) is connected to a common node (C) of the electric motor 48. A start winding is connected between the common node (C) and a start node (S). A run winding is connected between the common node (C) and a run node (R). The start node (S) and the run node (R) are each connected to a second electrical terminal (L2). A run capacitor 50 is electrically coupled in series with the start winding between the start node (S) and the second electrical terminal (L2). The refrigeration system control module 26 turns the electric motor 48 of the compressor on and off by opening and closing the compressor contactor 46 that connects or disconnects the common node (C) of the electric motor 48 to electrical terminal (L1).

Figure 3:
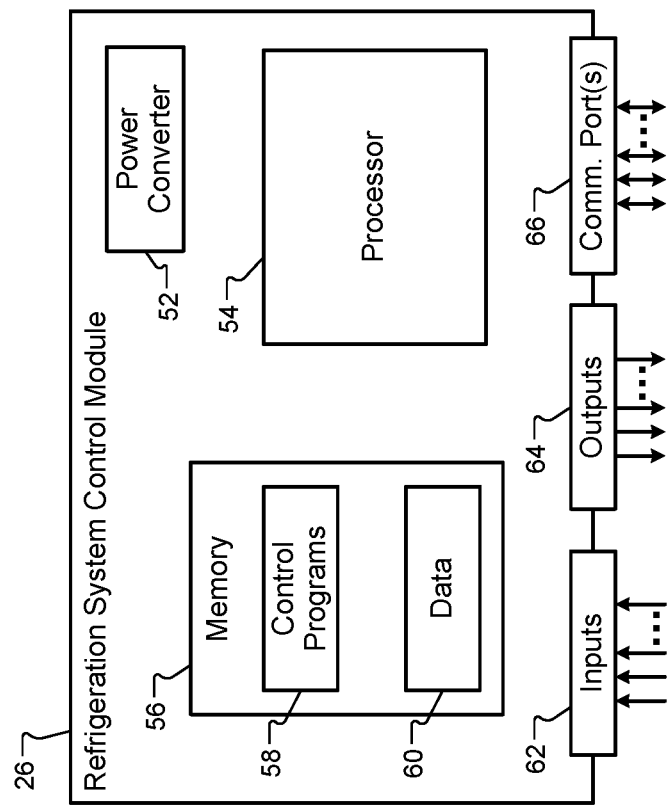
FIG. 3 is an example functional block diagram of a control module according to the present disclosure.

With reference to FIG. 3, the refrigeration system control module 26 is shown and includes a power converter 52, a processor 54, and memory 56. The power converter 52 is configured to convert power from the power supply 22 into a suitable power for logic of the refrigeration system control module 26. As an example, the power converter 52 may include an AC-DC converter and/or a buck converter that is configured to convert the AC power from the power supply 22 to a DC voltage suitable for logic of the refrigeration system control module 26 (e.g., 3.3 Volts, 2.5 Volts, etc.). Alternatively, the power converter 52 may only include a buck converter that receives a first DC power from the PFC circuit of the converter module 24 and converts it into a second DC power suitable for logic of the refrigeration system control module 26.

The memory 56 may store control programs 58. As an example, the control programs 58 may include programs for execution by the processor 54 to perform the control algorithms for executing various HVAC and refrigeration system functions. The memory 56 may be implemented by a non-transitory medium, such as a random-access memory (RAM) and/or read-only memory (ROM).

The memory 56 also includes data 60, which may include historical operational data of the compressor 12 and refrigeration systems 10, 40. The data 60 may also include configuration data, such as setpoints and control parameters. As an example, the data 60 may include system configuration data and asset data that corresponds or identifies various system components in the refrigeration system 10, 40. As an example, the asset data may indicate specific component types, capacities, model numbers, serial numbers, and the like. The refrigeration system control module 26 can then reference the system configuration data and asset data during operation as part of executing various HVAC and refrigeration system functions.

The refrigeration system control module 26 includes inputs 62, which may, for example, be connected to the various sensors, such as the current sensor 32. The refrigeration system control module 26 may also include outputs 64 for communicating output signals, such as control signals. For example, the outputs 64 may communicate control signals from the refrigeration system control module 26 to the compressor 12, as described herein. The refrigeration system control module 26 may also include communication ports 66. The communication ports 66 may allow the refrigeration system control module 26 to communicate with other devices, such as an optical sensor device (discussed below and shown with respect to FIGS. 5A-5B), a refrigeration system controller, a thermostat, and/or a remote monitoring device. The refrigeration system control module 26 may use the communication ports 66 to communicate through an internet router, Wi-Fi, or a cellular network device to a remote server for sending or receiving data.

With reference to FIG. 4, an illustration of an example sight glass 20 is shown. The sight glass 20 may be located between the condenser 14 and the flow control device 18 on the corresponding refrigeration line. In one embodiment, the sight glass 20 includes a lens 68, an indicator 70, and an indicator reference element 72. As an example, the lens 68 may implemented by a transparent material (e.g., glass, plastic, etc.). Accordingly, the technician may view the characteristics of the liquid refrigerant discharged from the condenser 14 (as indicated by the dashed line) through the lens 68, such as an amount of refrigerant charge in the refrigeration system.

Additionally, the indicator 70 may provide a visual indication corresponding to an amount of moisture in the refrigeration system. Specifically, the indicator 70 may have a color that represents an amount of moisture in the refrigeration system. Subsequently, the technician may compare the color of the indicator 70 to the indicator reference element 72 in order to determine a moisture level of the refrigeration system. Likewise, in other embodiments, the technician may view the characteristics of the lubricant of the compressor 12 using the lens 68 of the sight glass 20.

Figure 5B:
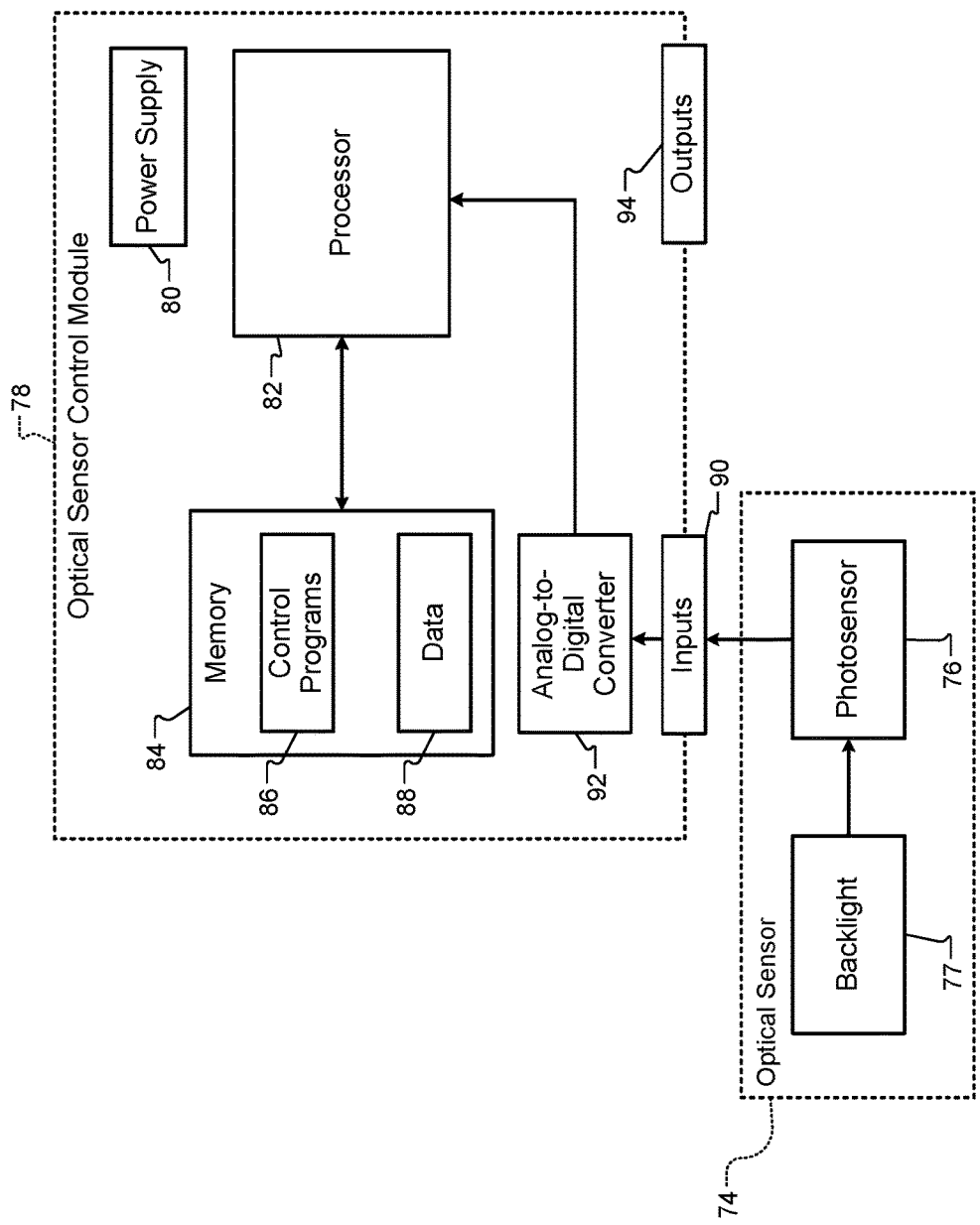

With reference to FIG. 5A, an example illustration of the sight glass 20, an optical sensor 74, and an optical sensor control module 78 is shown. In one embodiment, the optical sensor 74 is disposed on the sight glass 20, as shown by the dotted lines in FIG. 5A. As such, the optical sensor 74 is configured to obtain measurements associated with the refrigerant and/or lubricant. As an example, the optical sensor 74, using a photosensor and a backlight (shown in FIG. 5B) is configured to measure an amount of light and/or changes in light within the lens 68 of the sight glass 20 and convert the measurements into corresponding signals. Subsequently, the optical sensor control module 78 is configured to determine various operating conditions and/or characteristics of the refrigeration system based on the signals received from the optical sensor 74, as described below in further detail with reference to FIG. 5B.

In one example embodiment, refrigeration systems that have low refrigerant charge may have more bubbles within the refrigerant, while refrigeration systems that have a higher refrigerant charge may have less bubbles within the refrigerant. As such, the optical sensor 74 may be configured to detect dynamic flow characteristics created by the reflective light properties of a flow of bubbles within the liquid stream of refrigerant passing through the sight glass 20 by measuring an amount of light and/or changes in the amount of light with respect to a bias light value generated by, for example, the backlight of the optical sensor 74 (shown in FIG. 5B). The optical sensor control module 78 may then determine an amount of refrigerant charge of the refrigeration system, as described below in further detail with reference to FIG. 7.

In another example embodiment, compressors that have a low amount of lubrication may have more turbulence, while compressors that have a normal amount of lubrication may have less turbulence. As such, the optical sensor 74 may be configured to detect an amount of turbulence within the lubricant by measuring an amount of light and/or changes in the amount of light with respect to a bias light value generated by, for example, the backlight of the optical sensor 74. The optical sensor control module 78 may then determine an amount of lubricant of the compressor 12, as described below in further detail with reference to FIG. 8.

In another example embodiment, compressors that have a large amount of refrigerant within a compressor sump may be flooded (i.e., in a flooded state). Specifically, when an excessive amount of refrigerant is located within the compressor sump, the refrigerant may replace or offset the lubricant such that the lubricant floats on top of the refrigerant. As such, the optical sensor 74 may be configured to detect a presence of refrigerant in the compressor sump by measuring an amount of light and/or changes in the amount of light with respect to a bias light value generated by, for example, the backlight of the optical sensor 74. The optical sensor control module 78 may then determine whether the signals indicate that the compressor 12 is flooded. As an example, signals indicating significantly elevated levels of light reflectivity may indicate the presence of refrigerant and that the compressor 12 is flooded, while relatively lower levels of light reflectivity may indicate that the compressor 12 is not flooded and therefore does not include a significant amount of refrigerant within the compressor sump.

While this embodiment illustrates the optical sensor 74 and the sight glass 20 as separate components, in alternative embodiments, the optical sensor 74 and the sight glass 20 may be implemented by a single component. In other embodiments, the sight glass 20 may be removed, and the optical sensor 74 may be incorporated within the refrigeration system such that it can obtain measurements associated with the refrigerant and/or lubricant of the refrigeration system.

With reference to FIG. 5B, an example functional block diagram of the optical sensor 74, which includes a photosensor 76, a backlight 77, and an optical sensor control module 78, is shown. The photosensor 76 may be configured to detect dynamic flow characteristics created by the reflective light properties of a flow of bubbles within the liquid stream of refrigerant passing through the sight glass 20 by measuring an amount of light and/or changes in the amount of light with respect to a bias light value generated by the backlight 77 (e.g., a light-emitting diode (LED)). Additionally, the photosensor 76 may be configured to detect an amount of turbulence within the lubricant by measuring an amount of light and/or changes in the amount of light with respect to a bias light value generated by the backlight 77. Furthermore, the photosensor 76 may be configured to detect a presence of refrigerant in the compressor sump by measuring an amount of light and/or changes in the amount of light with respect to a bias light value generated by the backlight 77.

The optical sensor control module 78 may be implemented by a microcontroller. The optical sensor control module 78 includes a power supply 80 that is configured to provide power to the various components of the optical sensor control module 78. A memory 84 may store control programs 86. As an example, the control programs 86 may include programs for execution by a processor 82 to perform the control algorithms for detecting various refrigeration system abnormalities, such as a machine learning algorithm for detecting an amount of refrigerant charge and an algorithm for detecting an amount of lubricant, as described herein. The memory 84 may be implemented by a nontransitory medium, such as a random-access memory (RAM) and/or read-only memory (ROM). The memory 84 also includes data 88, which may include historical operational data corresponding to the refrigeration system abnormalities.

The optical sensor control module 78 includes inputs 90, which may, for example, be connected to the photosensor 76. The optical sensor control module 78 may also include an analog-to-digital converter (ADC) 92 for converting analog sensor data received at the inputs 90 to a digital value that is readable by the processor 82. The optical sensor control module 78 may also include outputs 94 for communicating output signals, such as alert signals. For example, the outputs 94 may communicate alert signals from the optical sensor control module 78 to at least one of a supervisory controller and a remote server, as shown below in FIGS. 6A-6B. Alternatively, the outputs 94 may communicate alert signals from the optical sensor control module 78 to the refrigeration system control module 26, as shown in FIGS. 6C-6D.

In other embodiments, the functions and configurations of the optical sensor control module 78 may be partially or entirely subsumed by the refrigeration system control module 26 or the supervisory controller described below in FIGS. 6A-6D.

Figure 6A:
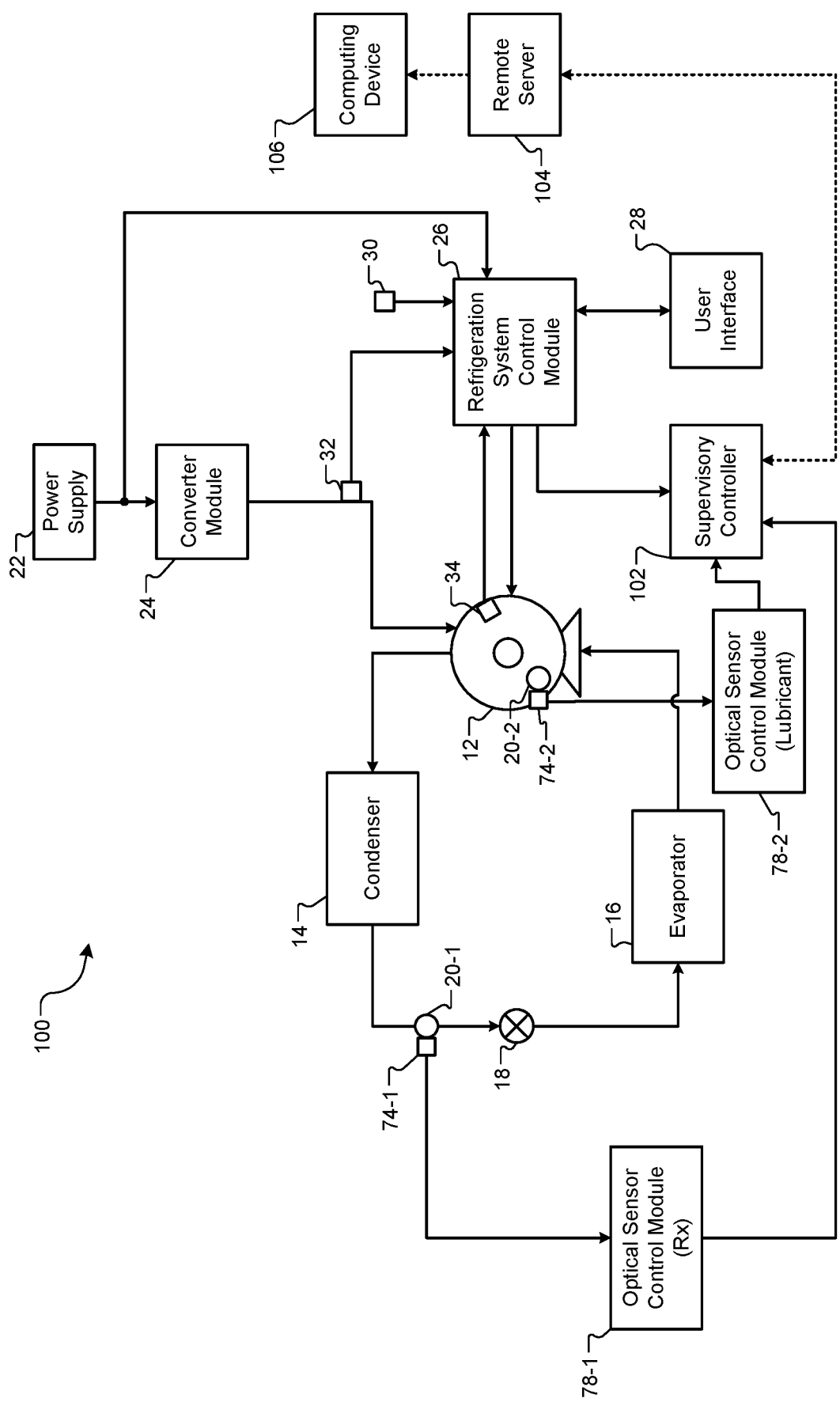
FIGS. 6A-6D are functional block diagrams of example refrigeration systems according to the present disclosure.

With reference to FIG. 6A, an example illustration of refrigeration system 100 is shown. Refrigeration system 100 is similar to the refrigeration system 10 described above with reference to FIG. 1A, but each of the sight glasses 20 is coupled to a respective optical sensors 74-1, 74-2 (collectively referred to as optical sensors 74). Furthermore, each of the optical sensors 74 is in communication with a respective optical sensor control module 78-1, 78-2 (collectively referred to as optical sensor control modules 78). As described above with reference to FIGS. 5A-5B, the optical sensors 74 and the optical sensor control modules 78 are configured to determine various operating refrigeration system abnormalities of the refrigeration system 100 and generate alerts based on the determined refrigeration system abnormalities.

As described above, the optical sensor control modules 78 may transmit alert signals corresponding to the refrigeration system abnormalities to at least one of a supervisory controller 102 (e.g., an EMERSON® E2 controller) and a remote server 104 via any suitable telemetric communication link. Based on the alert signal, the supervisory controller 102 and the remote server 104 are configured to, using a respective processor that is configured to execute instructions stored on a nontransitory memory, such as a random-access memory (RAM) and/or read-only memory (ROM), generate an indication of the refrigeration system abnormalities. As an example, the supervisory controller 102 may, in response to receiving the alert signals, generate visual indications on a graphical user interface of the supervisory controller 102 indicating that the refrigeration system 100 needs additional refrigerant charge, the compressor 12 needs additional lubricant, and/or the compressor 12 is flooded. As another example, the remote server 104 may generate and transmit the alert signal to a computing device 106 (e.g., smartphone, laptop, PDA, etc.), which is associated with an onsite and/or a remote technician. The computing device 106, in response to receiving the alert signal, may indicate, using a graphical user interface of the computing device 106, to the technician that the refrigeration system 100 needs additional refrigerant charge, the compressor 12 needs additional lubricant, and/or the compressor 12 is flooded.

Figure 6B:
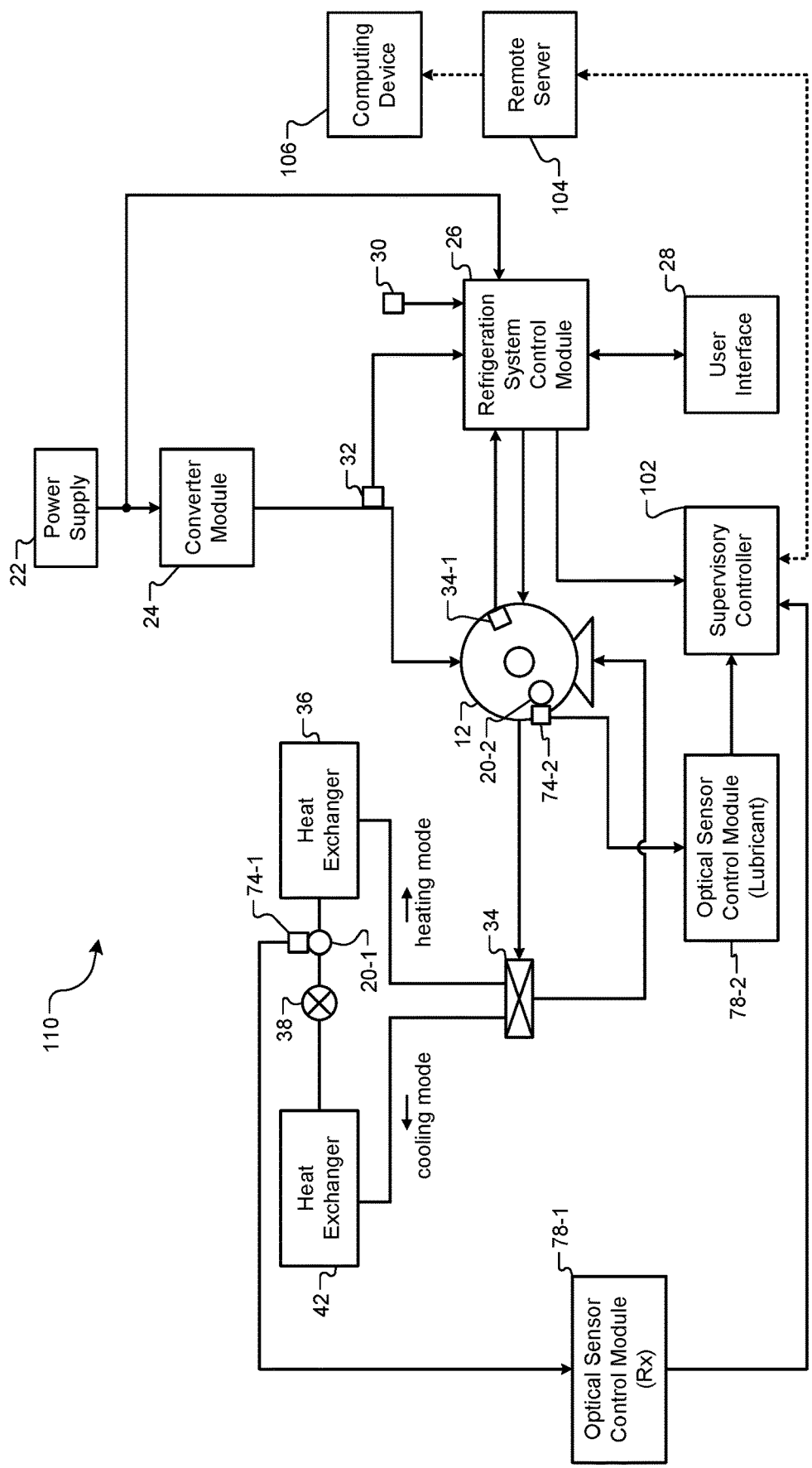
Figure 6C:
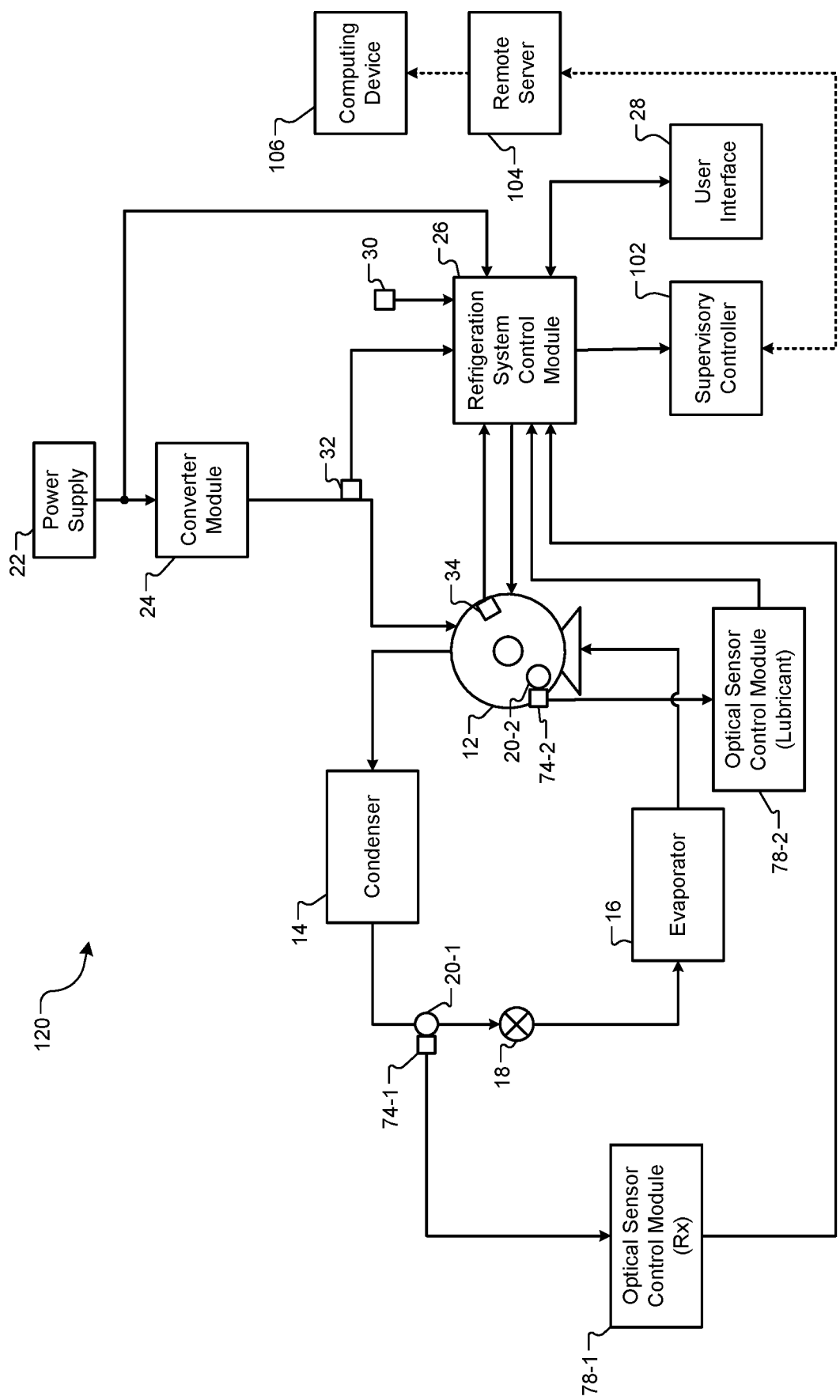
Figure 6D:
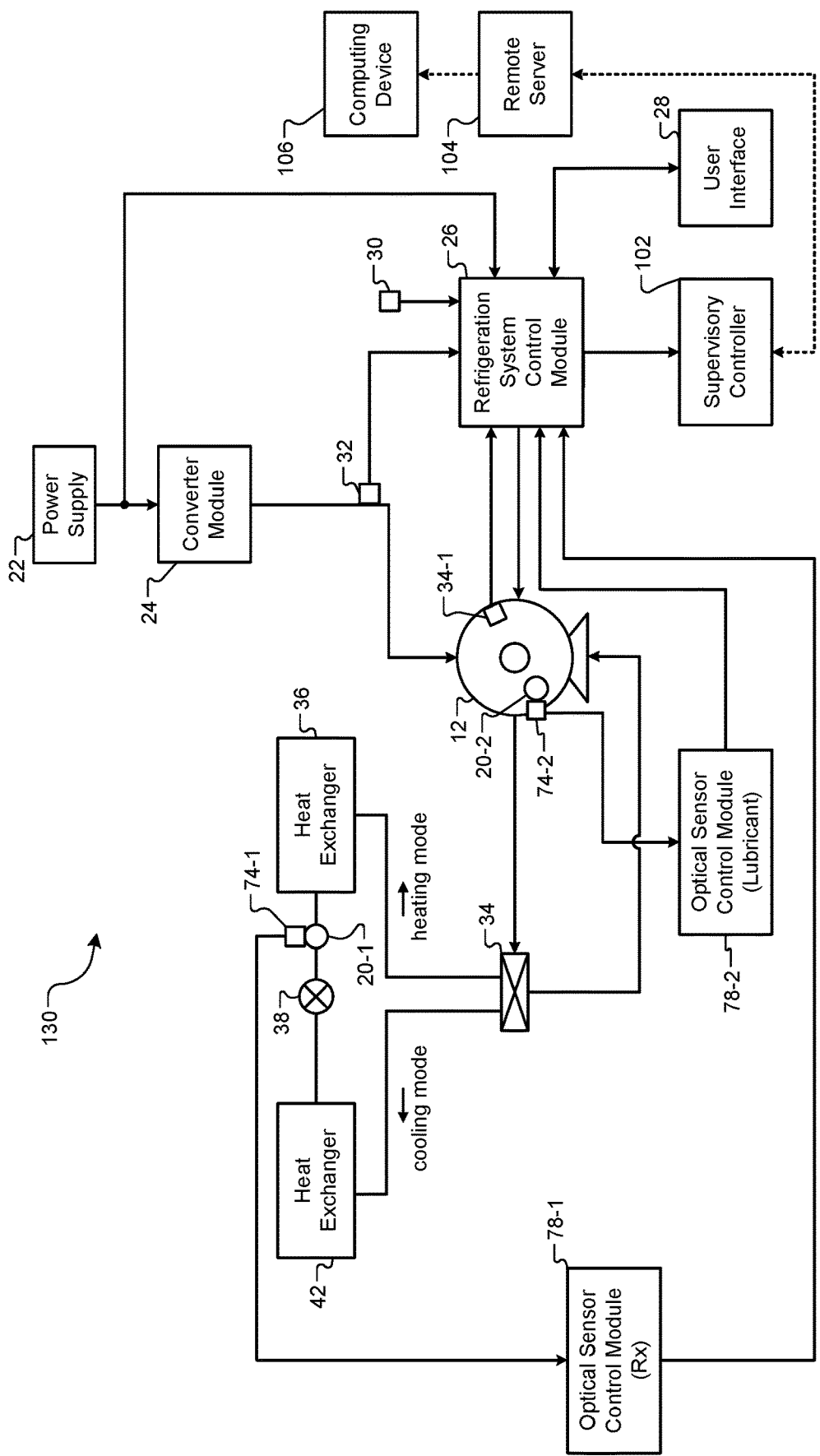

With reference to FIG. 6B, an example illustration of refrigeration system 110 is shown. Refrigeration system 110 is similar to refrigeration system 40 described above with reference to FIG. 1B, but each of the sight glasses 20 includes a respective optical sensor 74-1, 74-2 (collectively referred to as optical sensors 74). Furthermore, each of the optical sensors 74 is in communication with a respective optical sensor control module 78-1, 78-2 (collectively referred to as optical sensor control modules 78). As described above with reference to FIGS. 5A-5B, the optical sensors 74 and the optical sensor control modules 78 are configured to determine various operating refrigeration system abnormalities of the refrigeration system 110 and generate alerts based on the determined refrigeration system abnormalities.

Similar to the embodiment described above with reference to FIG. 6A, the optical sensor control modules 78 may be configured to transmit the alert signal to at least one of the supervisory controller 102 and the remote server 104. Based on the alert signal, the supervisory controller 102 and the remote server 104 are configured to, using a respective processor that is configured to execute instructions stored on a nontransitory memory, generate an indication of the refrigeration system abnormalities. As an example, the supervisory controller 102 may, in response to receiving the alert signals, generate visual indications on a graphical user interface of the supervisory controller 102 indicating that the refrigeration system 110 needs additional refrigerant charge, the compressor 12 needs additional lubricant, and/or the compressor 12 is flooded. As another example, the remote server 104 may generate and transmit the alert signal to the computing device 106 (e.g., smartphone, laptop, PDA, etc.), which is associated with an onsite and/or a remote technician. The computing device 106, in response to receiving the alert signal, may indicate, using a graphical user interface of the computing device 106, to the technician that the refrigeration system 110 needs additional refrigerant charge, the compressor 12 needs additional lubricant, and/or the compressor 12 is flooded.

With reference to FIG. 6C, an example illustration of refrigeration system 120 is shown. Refrigeration system 120 is similar to the refrigeration system 100 described above with reference to FIG. 6A, but in this embodiment, the optical sensor control modules 78 are configured to transmit the alert signal to the refrigeration system control module 26 provided that the inputs 62 (not shown) of the refrigeration system control module 26 are able to process the alert signal. In response to receiving the alert signal, the refrigeration system control module 26 is configured to indicate, using a user interface of the refrigeration system control module 26 or other discrete circuitry, that the refrigeration system 120 needs additional refrigerant charge, the compressor 12 needs additional lubricant, and/or the compressor 12 is flooded.

With reference to FIG. 6D, an example illustration of refrigeration system 130 is shown. Refrigeration system 130 is similar to the refrigeration system 110 described above with reference to FIG. 6B, but in this embodiment, the optical sensor control modules 78 are configured to transmit the alert signal to the refrigeration system control module 26 provided that the inputs 62 (not shown) of the refrigeration system control module 26 are able to process the alert signal. In response to receiving the alert signal, the refrigeration system control module 26 is configured to indicate, using a user interface of the refrigeration system control module 26 or other discrete circuitry, that the refrigeration system 130 needs additional refrigerant charge, the compressor 12 needs additional lubricant, and/or the compressor 12 is flooded.

Figure 7:
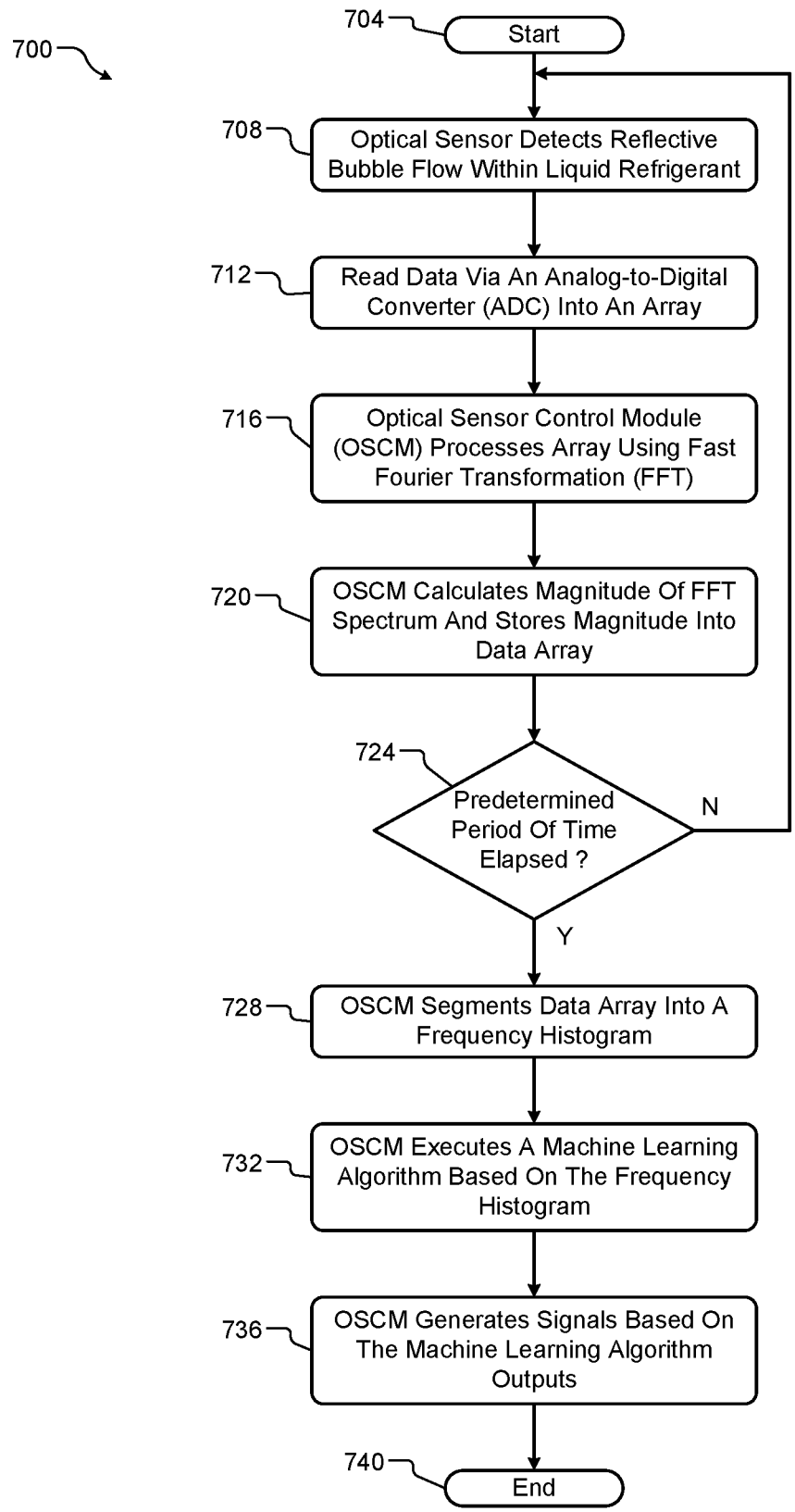
FIG. 7 is a flowchart for a control algorithm according to the present disclosure.

With reference to FIG. 7, a flowchart for a control algorithm 700 for detecting an amount of refrigerant charge of a refrigeration system is shown. The control algorithm 700 begins at 704 when, for example, the refrigeration system is turned on. At 708, the control algorithm 700 detects, using the optical sensor 74, reflective bubble flow within the liquid refrigerant. At 712, the control algorithm 700 reads, via the ADC 92, the data into an array. At 716, the control algorithm 700 processes, using the optical sensor control module 78, the array using a fast Fourier transform (FFT). The FFT may be defined as an algorithm that samples the signals received from the optical sensor 74 over a period of time and divides it into its frequency components.

At 720, the control algorithm 700 calculates, using the optical sensor control module 78, a magnitude of the FFT spectrum and stores the magnitude into a data array. At 724, the control algorithm 700 determines whether a predetermined period of time (e.g., 2 hours) has elapsed. The predetermined period of time may correspond to an amount of time that the optical sensor 74 is in a data acquisition mode. During the data acquisition mode, the optical sensor 74 collects and the optical sensor control module 78 processes data. Additionally, the optical sensor control module 78 may be configured to generate a signal in response to the optical sensor 74 operating in the data acquisition mode. As an example, while executing steps 708-720, the optical sensor control module 78 may generate a signal that causes a graphical user interface of the supervisory controller 102 to display an indication corresponding to the data acquisition mode. If the predetermined period of time elapses, the control algorithm 700 proceeds to 728; otherwise, the control algorithm 700 proceeds to 708.

At 728, the control algorithm 700 segments, using the optical sensor control module 78, the data array into a frequency histogram. At 732, the control algorithm 700 executes, using the optical sensor control module 78, a machine learning algorithm based on the frequency histogram. The machine learning algorithm may be implemented by, for example, a neural network. Furthermore, the hidden layers of the neural network may be configured to execute various linear functions or nonlinear functions (e.g., a sigmoid function) based on the frequency histogram. The neural network may also normalize data of the frequency histogram in order to decrease the amount of time that is needed to train the neural network and to improve the accuracy of the neural network.

In one embodiment, the machine learning algorithm may be configured to determine a probability that the refrigerant level of the refrigeration system is either at a sufficient level (i.e., normal), is below a threshold level (i.e., low), and/or is substantially below a threshold level (i.e., critically low). As an example, the machine learning algorithm may normalize the value of each frequency bin (e.g., a first frequency bin associated with a number of samples having a magnitude between 0-1000, a second frequency bin associated with a number of samples with a magnitude between 1001-2000, . . . a fifth frequency bin associated with a number of samples having a magnitude between 5001-6000, and a sixth frequency bin associated with a number of samples having a magnitude greater than or equal to 6001). The values may be normalized such that each frequency bin is associated with a value from 0-1. Based on each of the normalized frequency bin values, the machine learning algorithm may be configured to generate a probability value for each potential output (normal, low, critically low). Subsequently, the machine learning algorithm may determine a refrigerant level of the refrigeration system based on the probability values.

In another embodiment, the machine learning algorithm may be configured to generate a weight ratio based on the frequency histogram. The machine learning algorithm may generate the weight ratio based on (i) a first set of frequency bins of the frequency histogram and (ii) a second set of frequency bins of the frequency histogram, wherein each value of each frequency bin of the first set is less than each value of each frequency bin of the second set. As a more specific example, the machine learning algorithm may determine the number of samples of the two frequency bins having the lowest ranges (e.g., 2,794 samples in the 0-1000 frequency bin and 388 samples in the 1001-2000 frequency bin) and then sum the corresponding number of samples (3,182 samples). The machine learning algorithm may then identify and sum the samples of the remaining frequency bins (e.g., 2,818 samples for the remaining frequency bins). Subsequently, the machine learning algorithm may determine whether the weight ratio is greater than a threshold value (e.g., 1). The weight ratio may be based on (i) the sum of samples of the first set of frequency bins and (ii) the sum of samples of the second set of frequency bins. Specifically, the weight ratio may be determined by dividing the sum of samples of the first set of frequency bins by the sum of samples of the second set of frequency bins. If the weight ratio is greater than the threshold value, the machine algorithm may determine that there is a sufficient amount of refrigerant in the refrigeration system (i.e., normal). If the weight ratio is below the threshold weight ratio, the machine learning algorithm may determine that there is an insufficient amount of refrigerant in the refrigeration system (i.e., low). If the weight ratio is substantially below the threshold weight ratio, the machine learning algorithm may determine that there is a substantially insufficient amount of refrigerant in the refrigeration system (i.e., critically low).

At 736, the control algorithm 700 generates, using the optical sensor control module 78 and at least one of the supervisory controller 102 and the remote server 104, signals based on the machine learning algorithm outputs. As an example, the optical sensor control module 78 may generate a signal that causes a graphical user interface of the supervisory controller 102 to generate an indication that the amount of refrigerant in the refrigeration system is normal, low, or critically low. As another example, the signal may cause discrete circuitry (e.g., an LED circuit) of the supervisory controller 102 to generate an indication corresponding to the output (e.g., the LED circuit emits a green light when the refrigerant level is normal, a yellow light when it is low, and a red light when it is critically low).

Additionally, the optical sensor control module 78 may generate signals based on a status of the optical sensor 74. As an example, the optical sensor control module 78 may be configured to generate and output a pulse-width modulation (PWM) signal to the supervisory controller 102 based on a condition of the optical sensor 74. Specifically, the optical sensor control module 78 may generate a first PWM signal in response to the optical sensor 74 operating normally, and the optical sensor control module 78 may generate a second PWM signal in response to the optical sensor 74 operating incorrectly due to, for example, a fault. Alternatively, the optical sensor control module 78 may not generate a signal in response to the optical sensor 74 operating incorrectly. In other embodiments, the optical sensor control module 78 may only generate the PWM signal when the optical sensor 74 is operating incorrectly. As such, in response to receiving the signal based on the condition of the optical sensor 74, the graphical user interface of the supervisory controller 102 is configured to generate an indication corresponding to the condition of the optical sensor 74. At 740, the control algorithm 700 ends.

With reference to FIG. 8, a control algorithm 800 for detecting an amount of lubrication of the compressor 12 or whether the compressor 12 is operating in a flooded state is shown. The control algorithm 800 begins at 804 when, for example, the compressor 12 is turned on. At 808, the control algorithm 800 detects, using the optical sensor 74, turbulence within the lubricant. At 812, the control algorithm 800 determines, using the optical sensor control module 78, whether the compressor 12 is operating. If so, the control algorithm 800 proceeds to 816; otherwise, the control algorithm 800 remains at 812 until the refrigeration system control module 26 determines that the compressor 12 is operating. At 816, the control algorithm 800 reads, via the ADC 92, the data into an array.

At 820, the control algorithm 800 determines whether a predetermined period of time (e.g., 2 hours) has elapsed. The predetermined period of time may correspond to an amount of time that the optical sensor 74 is in a data acquisition mode. During the data acquisition mode, the optical sensor 74 collects and the optical sensor control module 78 processes data. Additionally, the optical sensor control module 78 may be configured to generate a signal in response to the optical sensor 74 operating in the data acquisition mode. As an example, while executing steps 808-816, the optical sensor control module 78 may generate a signal that causes a graphical user interface of the supervisory controller 102 to display an indication corresponding to the data acquisition mode. If the predetermined period of time elapses, the control algorithm 800 proceeds to 824; otherwise, the control algorithm 800 proceeds to 808.

At 824, the control algorithm 800 performs, using the optical sensor control module 78, a statistical analysis on the array. As an example, the optical sensor control module 78 may derive an average value of the array, a standard deviation of the array, a minimum value of the array, and/or a maximum value of the array. At 828, the control algorithm 800 segments, using the optical sensor control module 78, the standard deviation or a difference between the maximum value and the minimum value (i.e., a delta minimum/maximum value) in a frequency histogram. At 832, the control algorithm 800 determines, using the optical sensor control module 78, an amount of lubricant and/or whether the compressor is operating in a flooded state based on the largest segment of the frequency histogram and outputs a corresponding alert signal to at least one of the supervisory controller 102 and the remote server 104. In order to determine an amount of lubricant in the compressor 12, the optical sensor control module 78 may reference a lookup table that includes information associating various frequency components and lubricant levels. In order to determine whether the compressor 12 is operating in a flooded state, the optical sensor control module 78 may determine, based on the lookup table, whether the signals indicate significantly elevated levels of light reflectivity.

As an example, if the lubricant level of the compressor 12 is substantially less than a threshold value, the optical sensor control module 78 may provide a signal to the supervisory controller 102, which then generates an indication that the lubricant level of the compressor 12 is very low. As another example, if the lubricant level of the compressor 12 is less than but near the threshold value, the optical sensor control module 78 may provide a signal to the supervisory controller 102, which then generates an indication that the lubricant level of the compressor 12 is low. As another example, if the lubricant level of the compressor 12 is greater than or equal to the threshold value, the optical sensor control module 78 may provide a signal to the supervisory controller 102, which then generates an indication that there is a sufficient amount of lubricant in the compressor 12.

Furthermore, in response to the compressor 12 being in the flooded state, the optical sensor control module 78 may provide a signal to the supervisory controller 102, which subsequently generates an indication corresponding to the compressor 12 being in the flooded state. Furthermore, the signal may cause the supervisory controller 102 to activate a lubricant pump of the compressor 12 and thereby enable additional lubricant to enter the compressor sump. In other embodiments, the supervisory controller 102 may be configured to generate an indication corresponding to the operating condition of the optical sensor 74, as described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A refrigeration system comprising:
an optical sensor disposed on a sight glass of the refrigeration system and configured to generate signals based on a light reflectivity of a liquid of the refrigeration system; and
an optical sensor control module that includes a processor configured to execute instructions stored in a nontransitory memory, wherein the instructions include:
receiving the signals from the optical sensor;
generating a frequency distribution of the signals based on frequency components of the signals; and
determining an amount of liquid in the refrigeration system based on the frequency distribution;
and wherein the instructions further include, in response to the liquid being a refrigerant:
generating the frequency distribution associated with the refrigerant, wherein the frequency distribution is based on a fast Fourier transform (FFT) of the signals;
determining at least one probability, wherein each of the at least one probability corresponds to an amount of refrigerant of the refrigeration system; and
determining the amount of refrigerant of the refrigeration system based on the at least one probability.

2. The refrigeration system of claim 1, wherein in response to the liquid being the refrigerant, the instructions further include:
generating a weight ratio based on (i) a first sum of frequency components of a first set of frequency bins of the frequency distribution and (ii) a second sum of frequency components of a second set of frequency bins of the frequency distribution, wherein each value of each frequency bin of the first set of frequency bins of the frequency distribution is less than each value of each frequency bin of the second set of frequency bins of the frequency distribution, and each value of the frequency distribution is associated with dynamic flow characteristics of the refrigerant; and
in response to the weight ratio being less than a threshold weight ratio, generating a first alert signal indicating an insufficient amount of refrigerant of the refrigeration system.

3. The refrigeration system of claim 2, wherein generating the weight ratio further comprises dividing the first sum of frequency components of the first set by the second sum of frequency components of the second set.

4. The refrigeration system of claim 1, wherein in response to the liquid being a lubricant of a compressor of the refrigeration system, the instructions further include:
generating the frequency distribution associated with the lubricant, wherein the frequency distribution is based on a standard deviation of the signals;
identifying a largest frequency component of the frequency distribution; and
determining an amount of lubricant based on the largest frequency component.

5. The refrigeration system of claim 4, wherein the instructions further include determining whether the compressor is operating in a flooded state based on the largest frequency component.

6. The refrigeration system of claim 1, wherein in response to the liquid being a lubricant of a compressor of the refrigeration system, the instructions further include:
generating the frequency distribution associated with the lubricant, wherein the frequency distribution is based on a difference between a maximum value and a minimum value of the signals;
identifying a largest frequency component of the frequency distribution; and
determining an amount of lubricant based on the largest frequency component.

7. The refrigeration system of claim 6, wherein the instructions further include determining whether the compressor is operating in a flooded state based on the largest frequency component.

8. The refrigeration system of claim 1, wherein the instructions include transmitting an alert signal based on the amount of liquid to at least one of a remote server and a local controller in communication with the optical sensor control module.

9. The refrigeration system of claim 8, wherein the alert signal is configured to cause at least one of a computing device in communication with the remote server and the local controller to generate an indication corresponding to the alert signal.

10. A method comprising:
generating, using an optical sensor disposed on a sight glass of a refrigeration system, signals based on a light reflectivity of a liquid of the refrigeration system;
receiving, with an optical sensor control module, the signals from the optical sensor;
generating, with the optical sensor control module, a frequency distribution of the signals based on frequency components of the signals, wherein the optical sensor control module includes a processor configured to execute instructions stored in a nontransitory memory;
determining, using the optical sensor control module, an amount of liquid in the refrigeration system based on the frequency distribution; and
in response to the liquid being a refrigerant, (i) generating the frequency distribution associated with the refrigerant, wherein the frequency distribution is based on a fast Fourier transform (FFT) of the signals, (ii) determining at least one probability, wherein each of the at least one probability corresponds to an amount of refrigerant of the refrigeration system, and (iii) determining the amount of refrigerant of the refrigeration system based on the at least one probability.

11. The method of claim 10, wherein in response to the liquid being the refrigerant, the method further comprises:
generating, using the optical sensor control module, a weight ratio based on (i) a first sum of frequency components of a first set of frequency bins of the frequency distribution and (ii) a second sum of frequency components of a second set of frequency bins of the frequency distribution, wherein each value of each frequency bin of the first set of frequency bins of the frequency distribution is less than each value of each frequency bin of the second set of frequency bins of the frequency distribution, and each value of the frequency distribution is associated with dynamic flow characteristics of the refrigerant; and in response to the weight ratio being less than a threshold weight ratio, generating, using the optical sensor control module, a first alert signal indicating an insufficient amount of refrigerant of the refrigeration system.

12. The method of claim 11, wherein generating the weight ratio further comprises dividing the first sum of frequency components of the first set by the second sum of frequency components of the second set.

13. The method of claim 10, wherein in response to the liquid being a lubricant of a compressor of the refrigeration system, the method further comprises:

generating the frequency distribution associated with the lubricant, wherein the frequency distribution is based on a standard deviation of the signals;

identifying a largest frequency component of the frequency distribution; and determining an amount of lubricant based on the largest frequency component.

14. The method of claim 13, wherein the method further includes determining whether the compressor is operating in a flooded state based on the largest frequency component.

15. The method of claim 10, wherein in response to the liquid being a lubricant of a compressor of the refrigeration system, the method further comprises:

generating the frequency distribution associated with the lubricant, wherein the frequency distribution is based on a difference between a maximum value and a minimum value of the signals;

identifying a largest frequency component of the frequency distribution; and determining an amount of lubricant based on the largest frequency component.

16. The method of claim 15, wherein the method further includes determining whether the compressor is operating in a flooded state based on the largest frequency component.

17. The method of claim 10, wherein the method further includes transmitting an alert signal based on the amount of liquid to at least one of a remote server and a local controller in communication with the optical sensor control module.

18. The method of claim 17, wherein the alert signal is configured to cause at least one of a computing device in communication with the remote server and the local controller to generate an indication corresponding to the alert signal.

19. A refrigeration system comprising:

an optical sensor disposed on a sight glass of the refrigeration system and configured to generate signals based on a light reflectivity of a liquid of the refrigeration system; and an optical sensor control module having a processor and a nontransitory memory storing instructions that, when executed by the processor, configure the processor to:

receive the signals from the optical sensor;

generate a frequency distribution of the signals based on frequency components of the signals;

determine an amount of liquid in the refrigeration system based on the frequency distribution; and in response to the liquid being a lubricant of a compressor of the refrigeration system, (i) generate the frequency distribution associated with the lubricant, wherein the frequency distribution is based on a standard deviation of the signals, (ii) identify a largest frequency component of the frequency distribution; and (iii) determine an amount of lubricant based on the largest frequency component.

20. The refrigeration system of claim 19, wherein the instructions, when executed by the processor, further configure the processor to determine whether the compressor is operating in a flooded state based on the largest frequency component.

* * * * *